Patented May 21, 1929.

1,713,596

UNITED STATES PATENT OFFICE.

MAX EULE, OF BREMEN, GERMANY, ASSIGNOR TO ADOLF HARTMANN, OF BREMEN, GERMANY.

ARTIFICIAL ICE.

No Drawing. Application filed September 1, 1927, Serial No. 217,003, and in Germany September 28, 1926.

The invention relates to improvement in artificial ice. The main object of the invention is to produce a clear and hard artificial ice in a cheap, simple and effective manner.

Water containing dissolved gases and salts, especially salts of minor solubility, as e. g. calcium carbonate, is not adapted to produce clear or hard ice. Therefore, it has been proposed to remove such detrimental impurities before letting the water freeze. It is usual to remove such impurities by first adding calcium hydrate (lime water) to the water for the purpose of removing the calcium carbonates. The precipitate produced by such addition has been removed by filtration or by decanting the water and the part of the calcium compounds remaining dissolved in the water has been decomposed by the addition of an acid, if necessary, and thereupon the water freed from the calcium compounds has been treated in vacuum for the purpose of removing the gases dissolved. These steps have either been taken simultaneously or the gases have been removed first and thereupon the calcium compounds.

Other processes for preliminary removing injurious salts and gases in the water have also been used.

Water treated in such a manner or a natural water being practically free from dissolved gases and calcium carbonates contains generally larger or smaller amounts of readily soluble salts (e. g. sulphates and chlorides) which may substantially only be replaced by other salts but cannot be removed, without the distillation process.

Theoretically a water containing only soluble salts would be expected to give a clear and hard ice containing only in the interior a white opaque core formed by the last portions of the water in the shape of a more or less concentrated solution of salts.

In working such process in practice it has been found that no clear and hard ice is obtained but an opaque ice or an ice which at least is opaque in the outer layers. Such ice is soft, has an unsightly appearance and is, therefore, not marketable for many purposes. The reasons for the formation of such opaque ice or an ice with an opaque outer shell are the special conditions in the art of producing artificial ice. It is usual to apply a comparatively low freezing temperature, but in practical operation it is not possible to allow to the water much time for gradual cooling and inasmuch as the water, especially in summer which is the main season for the production of artificial ice, has a comparatively high starting temperature, a comparatively large difference of temperature will be found to exist between the middle portion and the outer portion of the supply of water so that freezing according to the usual theory is prevented and the said opaque or white outer shell containing dissolved salts enclosed in the frozen mass is obtained.

It has been proposed to avoid such formation of an opaque mantle by mechanically agitating or stirring the water by means of agitators or shaking apparatus; it has also been proposed to introduce compressed air, but these suggestions are open to various objections including the costs of the apparatus and waste of time.

According to my invention the production of a clear and hard artificial ice from natural water containing a small amount of soluble salts, such as sulphates and chlorides of the alkali metals and earth alkali metals (such contents being either present in the water originally or after a preliminary treatment) is effected by adding to the water a comparatively small amount of an easily soluble alkaline alkali compound which does not react at all with the salts dissolved in the water or at least not to any remarkable extent. Preferably sodium carbonate or sodium hydrate are used for this purpose; the percentage of such addition may be varied according to the special water to be treated and to the temperature conditions.

I do not desire to limit the scope of my invention by expounding theories, but according to my present knowledge the effect of the process according to my invention resides in the following:—

As mentioned above, it is known that a dilute aqueous solution of salts on being slowly cooled down to the freezing point of the water, has the tendency of causing the dissolved salts to separate out from such parts of the solution which are frozen first and to transfer these salts to such other parts of the solution where the salts are still in the dissolved state. In the art of producing artificial ice the water is generally frozen in containers or receptacles which are in most cases disposed in a liquid of low temperature. Hence the freezing of the water starts at a point of the water in the vicinity of the walls of the container and proceeds in the direction towards the interior of the container. Therefore, an outer shell of practically pure ice will be formed at first and the particles of dissolved salts are shifted gradually towards the interior or towards the vertical axis of the container.

When a comparatively long time is allowed for freezing the entire contents of the container, the speed of this shifting of the salts exceeds the speed of freezing and, therefore, a practically clear and hard ice with a white and opaque nucleus around the vertical axis of the container is obtained.

This speed of shifting of position or migration of the dissolved particles of the salts is only relatively limited, but it is remarkably increased by the addition of small quantities of alkaline agents. After the addition of such alkaline agents the dissolved salts will proceed or migrate to the interior of the freezing container with a sufficient speed to avoid their being cooled or enclosed by the freezing water and, therefore, by the addition of small quantities of free alkaline agents the freezing of the water may be effected under such conditions of temperature of the cooling liquid that the freezing of the salt particles is either entirely prevented or delayed until they have proceeded to the freezing core of the block of ice and a highly efficient and satisfactory rapid operation with good commercial effect may thus be obtained.

If my process is to be applied to water which has been preliminarily treated by means of the vacuum or with calcium hydrate and acid, if necessary, or alum or the like, the addition of the alkali may be effected at any time of the preliminary treatment. The addition may be made either before or during or after the respective steps of the preliminary treatment, thus for instance before the addition of calcium hydrate or simultaneously with or after such addition; if a preliminary treatment by means of vacuum is effected, the addition of the alkalis may be made before or simultaneously with or after such vacuum treatment.

The artificial ice according to my invention has either a white or opaque core or may be produced without such core by removing the last part of the water to be frozen in a suitable way, thus for instance by overturning or upsetting the container with the ice block just before the last segregated part has been frozen or by using a suitable suction or siphon device for removing the last parts of the water containing in a more concentrated condition practically all the salts which were present in the water.

*Example.*— To 1 cbm. of water containing about from 180–200 mg. of chemical bound chlorine, from 150–200 mg. of calcium sulphate and about 25 mg. of calcium carbonate per liter, a quantity of from 1.5–2.5 g. of caustic soda or of from 5.0–6.5 g. of calcinic sodium carbonate are added and the water which originally had an average temperature of about 15° C. is allowed to freeze at a temperature of about 5° C. below 0.

It should be understood that the theories and examples herein referred to are merely explanatory and illustrative of the results obtained, and are not to be interpreted in the sense of limitation of the broad aspects of the invention, as particularly set forth in the appended claims.

What I claim is:—

1. The process of manufacturing substantially clear artificial ice, which consists in removing difficultly soluble carbonates from the water, adding small amounts of readily soluble alkaline agents to the water, and allowing such water to freeze.

2. The process of manufacturing substantially clear artificial ice from undistilled water, which consists in removing difficultly soluble salts from the water, and adding small amounts of readily soluble alkaline agents and freezing the water thus treated.

3. The process of manufacturing substantially clear artificial ice from undistilled water containing readily soluble salts of the alkalis and of the alkaline earths, which consists in removing difficultly soluble salts from the water, and adding small amounts of readily soluble alkaline agents to the water and freezing the water thus treated.

4. The process of manufacturing substantially clear artificial ice from undistilled water, which consists in removing difficultly soluble salts from the water, adding small amounts of alkaline sodium compounds to the water, and freezing the water thus treated.

5. The process of manufacturing substantially clear artificial ice from ordinary undistilled water, which consists in removing difficultly soluble constituents from the water, adding small amounts of sodium carbonate to the water and freezing the water thus treated.

6. The process of manufacturing substantially clear artificial ice from ordinary undistilled water, which consists in removing difficultly soluble constituents from the water, adding small amounts of alkaline alkali salts to the water, causing a certain volume of the water thus treated to freeze from the outside towards the inside, and removing the still liquid core portion of said volume, when the freezing has proceeded up to such core portion.

7. The process of manufacturing clear artificial ice from ordinary undistilled water, which consists in treating such water with comparatively small amounts of alkaline alkali compounds, removing difficultly and precipitating constituents and gases from the water, and freezing the water thus treated.

8. The process of manufacturing clear artificial ice from ordinary water free from difficultly soluble constituents, and containing readily soluble salts of the alkalis and of the alkali-earths, which consists in removing gases from the water, treating it with comparatively small amounts of alkaline alkali-compounds, and freezing the water thus treated.

9. Process for producing a clear and hard artificial ice from natural water, the ice being practically free from dissolved gases and calcium carbonates and containing only a content of readily soluble salts, such as sulphates and chlorides, mainly the alkalis and of the alkaline earths, either from nature or after a preliminary purification, characterized thereby that the water to be frozen is admixed with small quantities of a readily soluble alkali, preferably carbonate of soda or caustic soda.

10. The process of manufacturing substantially clear artificial ice from ordinary undistilled water, which consists in removing difficultly soluble constituents from the water, adding 1.5 to 2.5 grams of caustic soda per cubic meter of the water and freezing the water thus treated.

11. The process of manufacturing substantially clear artificial ice from ordinary undistilled water, which consists in removing difficultly soluble constituents from the water, adding 5.0 to 6.5 grams of calcinic sodium carbonate per cubic meter of water and freezing the water thus treated.

In testimony whereof I have affixed my signature.

MAX EULE.